Oct. 3, 1967   J. F. REUTHER   3,345,522
SYSTEM FOR PROVIDING REACTION INDICATIVE OF DEVIATION
FROM A PREDETERMINED ORDER
Filed Dec. 4, 1964
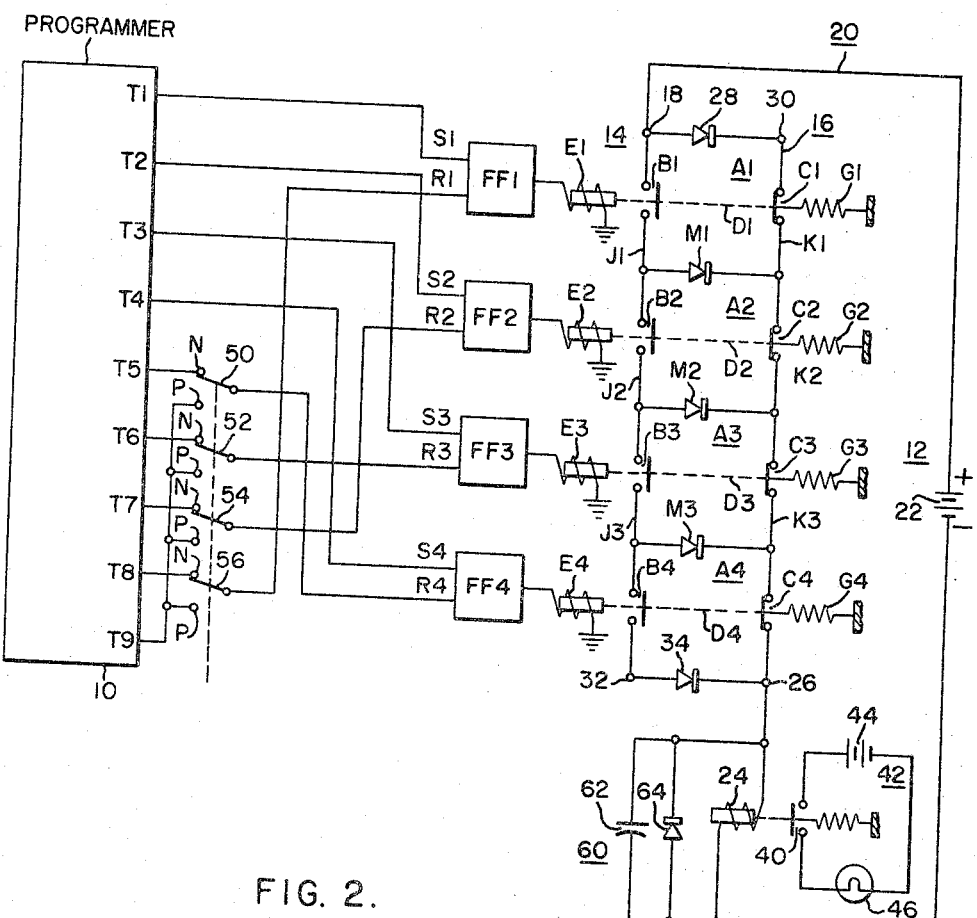
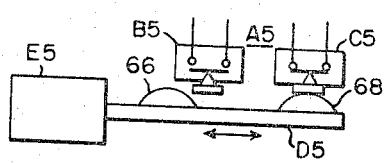
INVENTOR
John F. Reuther

United States Patent Office 3,345,522
Patented Oct. 3, 1967

3,345,522
SYSTEM FOR PROVIDING REACTION INDICATIVE OF DEVIATION FROM A PREDETERMINED ORDER
John F. Reuther, Penn Hills, Pa., assignor to Westinghouse Electric Corporation, East Pittsburgh, Pa., a corporation of Pennsylvania
Filed Dec. 4, 1964, Ser. No. 415,920
11 Claims. (Cl. 307—112)

This invention relates to switching systems and more particularly to a switching system for detecting a miss or an out-of-order occurrence of any event of a plurality of events which normally should occur in a predetermined sequence.

It is therefore an object of this invention to provide a novel system for providing a reaction indicative of either a miss in an ordered sequence of events or the out-of-sequence occurrence of any one of a plurality of events relative to a predetermined order.

Another object of the invention is to detect any deviation from a preselected sequence of events.

The above objects are attained in accordance with one embodiment of the invention wherein a plurality of switches, when operated in the desired sequence, maintain an indicator circuit closed through a different asymmetric link for each sequential switch operation. If there is a deviation from the desired sequence, the path through the indicator circuit is switched through one of the asymmetric links in the reverse direction, thereby effectively opening the indicator circuit to provide an indication of the out-of-order operation.

Other and further objects and advantages of the invention will be apparent from the following detailed description taken in connection with the drawings wherein:

FIGURES 1 and 2 are diagrams illustrating preferred embodiments of the invention.

Referring now to FIG. 1, there is shown a programmer 10 for normally providing at selected intervals consecutive signals at terminals T1, T2, T3, T4, T5, T6, T7 and T8 in that order. For convenience, signals at these respective terminals will be identified with the reference characters of their associated terminals. For example, a signal at terminal T4 will be referred to as signal T4, etc.

The programmer 10 may be any device or system which may be arranged to produce successive randomly or uniformly spaced signals. For example, the programmer 10 could be a simple commutator, or a sophisticated storage and read-out system. Programmer 10 may, for example, represent an electromechanical system which translates a plurality of sequential mechanical movements or operations into a corresponding number of signals representing such movements or operations. It is the purpose of a system 12 in FIG. 1 to provide an indication when there is a miss or deviation from the normal or desired signal sequence T1, T2, T3, T4, T5, T6, T7, and T8 in that order.

System 12 includes a switching system having a plurality of switch sets A, more specifically designated as A1, A2, A3 and A4. Each switch set A includes a pair of switches B and C intercoupled by a common actuating link D in such manner that at any given time, only one of the switches is open while the other is closed. For example, in any switch set A, when switch B is open, switch A is closed, and vice versa. In the respective switch sets A, the switches B and C and the coupling links D, bear, as a suffix, the identifying number of the associated switch set. For example, in switch set A3, the respective switches and coupling link are labeled B3, C3, and D3.

Each of the switch sets A has associated therewith an electromagnetic actuator E connected to the coupling D so that when the actuator E is energized, the switch set A is driven to one of its modes of operation. When the actuator E is unenergized, the switch set A is operated to its opposite or other mode of operation by a tension spring G connected to the coupling D.

Each of the electromagnetic actuators E is driven by a flip-flop FF so arranged that the actuator E is energized when the flip-flop is in its set state, which it assumes in response to a signal applied to its set input terminal S. In response to a signal on its reset terminal R, flip-flop FF assume sits reset state thus deenergizing actuator E and dropping out the switch set A. It will be apparent from the drawing that the actuator E and the flip-flop FF associated with each switch set A is indicated by the references E and FF suffixed by the numeral identifying the switch set. Thus, flip-flop FF1 and actuator E1 are associated with switch set A1, and flip-flop FF2 and actuator E2 are associated with switch set A2, etc. All the flip-flops FF are shown in the reset state, and the actuators E in the unenergized condition. Thus all the switch sets A are shown dropped out, in which mode all the switches B are open and all the switches C are closed.

All the switches B (B1–B4) are connected in series to form a first series string 14. In like manner, all the switches C (C1–C4) are connected in series to form a second series string 16. Since all the B switches are connected in series, the series string 14 has a plurality of junctions J, in consecutive order, each between a different pair of adjacent B switches in the string. More specifically there is a junction J1 between the pair of adjacent switches B1 and B2; a junction J2 between the pair of adjacent switches B2 and B3; and a junction J3 between the pair of adjacent switches B3 and B4. In like manner, because all the C switches are connected in series in the string 16, this string has a plurality of junctions K, each between a pair of adjacent C switches. More specifically, junction K1 is between switches C1 and C2; junction K2 is between switches C2 and C3; and junction K3 is between switches C3 and C4.

The upper end 18 of string 14 is connected to the positive end of a load circuit 20 which includes in series a suitable source of direct current such as the battery 22, and a load 24, thus identifying the series string 14 with positive polarity. The negative end of the load circuit 20 is connected to the lower end 26 of series string 16, thus identifying the series string 16 with negative polarity. The load 24, may for example be an electro-responsive indicating means such as the relay shown.

An asymmetric current carrying device 28 is connected between the upper end 18 of string 14 and the upper end 30 of series string 16, the device 28 being poled in its forward direction relative to the polarities that strings 14 and 16 are identified with. More specifically, the current inlet electrode of the asymmetric device 28 is connected into string 14 which is identified with the positive polarity of line 20, while the current outlet electrode of the asymmetric device 28 is connected to the series string 16 which is identified with the negative end of battery 22. The lower end 32 of series string 14 is connected through an asymmetric current carrying device 34 to the lower end 26 of the series string 16, device 34 being poled in its forward direction relative to the polarities with which strings 14 and 16 are respectively identified.

Relative to the upper end 18 of string 14, switches B1 and B2 are the first pair of adjacent switches in the string 14, switches B2 and B3 are the second pair of switches, and switches B3 and B4 are the third pair of adjacent switches in string 14. Beginning at the upper end 30 of series string 16, such as C1 and C2 are the first pair of adjacent switches, switches C2 and C3 are the second pair of adjacent switches, and switches C3 and C4 are the third pair of adjacent switches. From the above, it is readily apparent that the pair of adjacent switches B1 and B2 and the pair of adjacent switches C1 and C2 are correspondingly placed in their respective strings, that is, each is first in the consecutive order in its string. Using the same type of relations, it is apparent that switches B2 and C2 occupy corresponding or like positions in their respective strings. In like manner, the position of junction J3 in its string corresponds to the position of junction K3 in its string. The above relationship examples are included merely to illustrate one scheme of description of relative placement employed in this detailed description of the invention.

The switching system further includes a plurality of asymmetric devices M, and the junction between each adjacent pair of switches in one string is connected through a different one of the asymmetric devices M to the junction between the correspondingly placed pair of adjacent switches in the other string. More specifically, junction J1 between the pair of adjacent switches B1 and B2 is connected through asymmetric device M1 to the junction K1 between switches C1 and C2.

Junction J2 is connected through asymmetric device M2 to junction K2, and junction J3 is connected through asymmetric device M3 to junction K3. Thus, from the aforesaid description, it is apparent that the junction between each pair of adjacent switches in one string is connected through a different one of the asymmetric devices M to the junction between the correspondingly placed pair of adjacent switches in the other string.

All the heretofore mentioned asymmetric devices may be suitable diodes, for example semiconductor diodes. The following connections are adapted relative to the asymmetric device symbols employed in the drawing. The arrow head portion of the symbol is the current inlet electrode often referred to as the anode, while the cross bar portion of the symbol is the current oulet electrode often referred to as the cathode. The asymmetric device conducts current in the forward direction (direction of arrow head of symbol) when the current inlet electrode is positively biased relative to the current outlet electrode.

As in the case of diodes 28 and 34, the diodes M1, M2 and M3, are poled in their forward direction relative to the polarities with which the strings 14 and 16 are respectively identified. More specifically the anodes of diodes M1, M2 and M3 are connected in string 14 because this string is identified with the positive DC line 20, while the cathodes of the devices M1, M2 and M3 are connected to the string 16 because this string is identified with the negative side of battery 22. Thus all the asymmetric devices (28, 34, M1, M2 and M3) are poled in the same direction between strings 14 and 16.

The electroresponsive indicating device 24 is, by way of example, in the form of a relay with a set of contacts 40 for opening and closing an alarm circuit 42, including a battery 44 and an annunciator 46 which may be visual or audio, such as an electric lamp or an electric bell. When the relay 24 is energized in the example shown, the contacts 40 are open. With relay 24 unenergized, contacts 40 are closed and the annunciator 46 is energized to flash if a light, or ring if a bell.

Referring again to the programmer 10, its terminals T1, T2, T3 and T4 are connected to the set terminals S1, S2, S3 and S4 of flip-flops FF1, FF2, FF3 and FF4 respectively. The respective reset terminals R1, R2, R3 and R4 of the flip-flops are connected to the poles of single pole double through switches 50, 52, 54 and 56. Each of these switches has a contact N connected to a different one of output terminals T5, T6, T7 and T8, while the other contact P of all these switches is connected to an output terminal T9, which provides a signal T9 programmed to occur after signal T4. Switches 50, 52, 54 and 56 may be individually operated or ganged as shown. With these switches in the position shown in the drawing, signals T5, T6, T7 and T8 are sequentially applied to reset terminals R4, R3 R2 and R1 in that order to reset their associated flip-flops FF4, FF3, FF2, and FF1 in that order.

Operation of the system may be understood from the following description. The drawing shows all the flip-flops FF in the reset state, the actuators E unenergized, and all the switch sets A in the mode wherein all the B switches are open and all the C switches are closed. Thus, all the switches in string 14 are open and all the switches in string 16 are closed. Under these conditions, a continuous circuit may be traced from the positive side of battery 22 through diode 28, closed switches C1, C2 C3 and C4, the operating coil of relay 24 and back to the negative terminal of battery 22. Thus, relay 24 is energized and the alarm circuit 42 is open.

Now assume that the programmer 10 provides consecutive signals T1, T2, T3 and T4 in the order named. When signal T1 appears, it is applied to the set terminal S1 of flip-flop FF1 to operate this flip-flop in the set state and thereby energize the electromagnetic actuator E1. This operates switch set A1 in its other mode wherein switches B1 and C1 are closed and open respectively. Although switch C1 is now open, the circuit to the indicator device 24 is still closed by means of closed switch B1 and diode M1. When the next signal T2 appears, flip-flop FF2 is operated to its set state, energizing the actuator E2 to operate switch set A2 to its other mode wherein switches B2 and C2 are respectively closed and open. At this time, although switches C1 and C2 are open, the circuit to the indicating device 24 is still closed by way of closed switches B1 and B2 and the diode M2.

In like manner as signal T3 appears in its desired sequence, it causes switch set A3 to assume the mode wherein switches B3 and C3 are closed and open, respectively. Again the circuit to the indicator device 24 is still complete and may be traced through closed switches B1, B2 and B3 and the diode M3. When signal T4 appears, it operates flip-flop FF4 in its set state to thereby operate switch set A4 in the mode wherein switches B4 and C4 are respectively closed and opened. At this point of operation, all the switches in string 16 are open while all the switches in string 14 are closed and a circuit through the indicator device is still complete by way of the closed switches in string 14 and the diode 34.

As the signals T5, T6, T7 and T8 appear in sequence, they sequentially reset flip-flops FF4, FF3, FF2 and FF1, in that order to sequentially reverse the operational modes of switch sets A4, A3, A2 and A1, in that order. After each of these sequential resets, the circuit through the indicator device 24 is maintained successively through diodes M3, M2 and M1 and diode 28. Thus during the entire signal sequence from T1 through T8, the indicating device 24 remained energized and the alarm circuit 42 was open.

Let us now suppose that something happens in the programmer 10 and the signals appear in the sequence T1, T2, T4 and T3. After the successive appearances of signals T1 and T2 which set flip-flops FF1 and FF2, the circuit to the indicator device 24 will be closed through closed switches B1 and B2 and diode M2. But now signal T4 appears out of its proper order and sets the flip-flop FF4 to operate the switch set A4 in the mode wherein switches B4 and C4 are respectively closed and opened.

At this point of operation, the circuit to the indicator device 24 is open at switches B3 and C4, the path through closed switches C3 and B4 being blocked by the now reverse biased diode M3. As a result, the indicator device 24 is deenergized thereby closing the alarm circuit 42 and setting off the alarm operating the annunciator 46. This type of a break in the load circuit 20 will occur whenever a signal is missed in its proper sequence or it occurs out of order of its proper sequence.

To provide continuous energization of the load 24 without a break as the switch sets A are operated in correct sequence, each switch set A may have a make-before-break relationship between its switches B and C, or a delay circuit 60 including a capacitor 62 and commutating diode 64 may be connected across the load 24 to delay dropout of relay 24.

From the description herein, some generalizations may be made. Each switch set A is operable to the mode wherein its B switch is closed and its C switch is open in response to a different one of a plurality of events. More specifically, the immediate event to which switch set A1 responds is the energization of the electromagnetic actuator E1; the event to which switch A2 responds is the energization of its electromagnetic actuator E2; the event to which switch set A3 responds is the energization of actuator E3; and the event to which switch set A4 responds is the energization of actuator E4. Thus, each switch set A responds to a different one of a plurality of events to operate the switch set in the mode wherein its B switch is closed and its C switch is open. By the same token, each of the switch sets A is responsive to a different one of a plurality of events to operate the switch set in the mode wherein its C switch is closed and its B switch is open. More specifically, switch set A1 is responsive to the deenergization of actuator E1 and the pull of spring G1; the event to which switch set A2 responds is the deenergization of actuator E2 and the pull of spring G2; the event to which switch set A3 responds is the deenergization of actuator E3 and the pull of spring G3; and the event to which switch set A4 responds is the deenergization of actuator E4 and the pull of spring G4. Thus, it is seen that each switch set A is operable in response to a different one of a plurality of events to cause it to assume the mode wherein its B switch and C switch are respectively open and closed.

The appearances of signals T1, T2, T3, etc. are also a plurality of events, albeit more remote, to which the respective switch sets respond, and the causes in the programmer 10 which produce signals T1, T2, T3, etc., are also a plurality of events, even though more remote, to which the respective switch sets A respond.

If desired, the contacts 40 of the electro-responsive indicating device 24 may be operated in the opposite manner, that is, to close contacts 40 in response to the energization of the operating coil of the device 24. In this manner of operation, the annunciator (lamp or buzzer) 46 would remain activated as long as the switch sets A are operated in the proper sequence (in consecutive order), and the annunciator 46 would be deactivated if the circuit to the device 24 were broken by a miss or an out-of-order operation of the respective switch sets A. The same manner of operation can be effected if desired without the intervening relay 24 by substituting directly for the relay an annunciator such as an electric lamp or electric bell between the circuit point 26 and the negative end of battery 22. In such an arrangement, the annunciator would remain activated as long as the switch sets are operated in correct consecutive order.

From a geometric configuration standpoint, the series strings 14 and 16 may be considered as opposite parallel sides of a ladder network with a plurality of asymmetric links connected thereacross. Conduction is transferred consecutively from one to the other of the asymmetric links as long as switch sets A are operated in consecutive order.

From the description herein, it may be observed that all the diodes are so poled that if any number less than all of consecutive switches in one string beginning at one end of the string are closed, while the remaining switch or switches in that string are open, one of the diodes will be forward biased providing a current path from the battery 22 through the load 24.

It will be appreciated that all the diodes may be poled in the opposite direction provided that the battery 22 is reversed in polarity.

In FIG. 2 a switch set A5 illustrates a variation of switch set A which may be substituted for each of the switch sets A of FIG. 1. In switch set A5, microswitches B5 and C5 correspond to the B and C switches of the switch sets in FIG. 1, while a rod D5 corresponds to the coupling D between switches B and C of FIG. 1. The rod D5 which is provided with two cams 66 and 68 is coupled to and driven by an actuator E5 which may be an electrically or a fluid driven two-position fluid valve. In one position of the valve E5, cam 68 engages switch C5 to close it, while cam 66 is disengaged from switch B5, whereby switch B5 is open. In the other position of valve E5, cam 66 engages switch B5 to close it, while cam 68 is disengaged from switch C5, and the latter is open. In the embodiment of FIG. 2, rod D5, just as the coupling D in any of the switch sets A in FIG. 1, functions as a coupling or interlock between switches B5 and C5, whereby one is open while the other is closed at any given time.

It is to be understood that the herein described arrangements are simply illustrative of the principles of the invention, and that other embodiments and applications are within the spirit and scope of the invention.

I claim as my invention:

1. A switching circuit comprising a plurality of switch sets, each set including respective first and second switches interlinked to provide to the set first and second operational modes, in the first mode one switch of the set being open while the other switch of the set is closed and vice versa in the second mode, respective positive and negative direct current supply lines, first and second asymmetric devices, a plurality of asymmetric devices other than said first and second asymmetric devices, means connecting all of said one switches in a first series string whereby said first string has a plurality of junctions in consecutive order each between a different pair of adjacent switches in that string, means connecting all said other switches in a second series string, whereby said second string has a plurality of junctions in consecutive order each between a different pair of adjacent switches in that string, one end of one of said strings being connected to one of said direct current lines, whereby said one string is identified with the polarity of said one direct current line, said one end of said one series string being connected through said first asymmetric device to one end of the second series string, the other end of the first string being connected through said second asymmetric device to the other end of the second string, a load connected between said other end of the second string and the other direct current line, whereby said second string is identified with the polarity of said other direct current line, each of said junctions occupying a particular position in said consecutive order in its string relative to said one end of the string, each said junction in the first string being connected through a different one of said plurality of asymmetric devices to the correspondingly positioned junction in the second string, all said asymmetric devices being poled in the same direction between said strings, all said asymmetric devices being poled in the forward direction relative to said polarities that the strings are identified with.

2. The combination as in claim 1 and further including means for producing a plurality of events, and means for operating each switch set in each of its modes in response to a different one of said plurality of events.

3. A switching circuit comprising a plurality of switch sets, each set including respective first and second switches interlinked to provide to the set first and second operational modes, in the first mode one switch of the set being open while the other switch of the set is closed and vice versa in the second mode, respective positive and negative direct current supply lines, first and second asymmetric devices, a plurality of asymmetric devices other than said first and second asymmetric devices, means connecting all of said one switches in a first series string whereby said first string has a plurality of junctions in consecutive order each between a different pair of adjacent switches in that string, means connecting all said other switches in a second series string, whereby said second string has a plurality of junctions in consecutive order each between a different pair of adjacent switches in that string, one end of one of said strings being connected to one of said direct current lines, said one end of said one series string being connected through said first asymmetric device to one end of the second series string, the other end of the first string being connected through said second asymmetric device to the other end of the second string, a load connected between said other end of the second string and the other direct current line, each of said junctions occupying a particular position in said consecutive order in its string relative to said one end of the string, each said junction in the first string being connected through a different one of said plurality of asymmetric devices to the correspondingly positioned junction in the second string, all said asymmetric devices being poled in the same direction between said strings, all said asymmetric devices being so poled that if any number less than all of consecutive switches in one string beginning at one end of the string are closed while the remaining switch or switches in that string are open one of said asymmetric devices will be forward biased providing a current path from said direct current supply lines through the load.

4. A switching circuit comprising a plurality of switch sets, each set including respective first and second switches interlinked to provide to the set first and second operational modes, in the first mode one switch of the set being open while the other switch of the set is closed and vice versa in the second mode, first and second asymmetric devices, a plurality of asymmetric devices other than said first and second asymmetric devices, means connecting all of said one switches in a first series string whereby said first string has a plurality of junctions in consecutive order each between a different pair of adjacent switches in that string, means connecting all said other switches in a second series string, whereby said second string has a plurality of junctions in consecutive order each between a different pair of adjacent switches in that string, one end of one of said strings being connected through said first asymmetric device to one end of the second series string, the other end of the first string being connected through said second asymmetric device to the other end of the second string, each of said junctions occupying a particular position in said consecutive order in its string relative to said one end of the string, each said junction in the first string being connected through a different one of said plurality of asymmetric devices to the correspondingly positioned junction in the second string, each of all said asymmetric devices having a current inlet electrode and a current outlet electrode, all said current inlet electrodes being directed toward the first string, all said current outlet electrodes being directed toward the second string, and a load circuit including in series a direct current power supply source and a load, one end of the load circuit having positive polarity, the other end of the load circuit having negative polarity, the positive end of the load circuit being connected to said one end of the first string, and the negative end of the load circuit being connected to said other end of the second string 5. The combination as in claim 4 and further including means for producing a plurality of events, and means for operating each switch set in one of its modes in response to a different one of said plurality of events.

6. A switching system comprising a plurality of switches connected in consecutive order to form a first series string, a second like plurality of switches connected in said consecutive order to form a second series string, a first asymmetric device connected between one end of the first string and one end of the second string, a second asymmetric device connected between the other ends of said strings, a plurality of asymmetric devices other than said first and second asymmetric devices, means connecting the junction between each pair of adjacent switches in one string through a different one of said plurality of asymmetric devices to the junction between the correspondingly placed pair of adjacent switches in the other string, each of all said asymmetric devices having respective current inlet and outlet electrodes, the current inlet electrode of each of said asymmetric devices being oriented toward the first string and its outlet electrode being oriented toward the second string, each switch in one string and the correspondingly placed switch in the other string being referred to as a corresponding pair of switches, operator means for each corresponding pair of switches, each operator means having a first state of operation wherein one switch and the other switch of the corresponding pair associated therewith are respectively open and closed, each operator means having a second state of operation wherein said one switch and the other switch of the corresponding pair associated therewith are respectively closed and open, whereby at any given time the switches within each corresponding pair are in opposite ones of closed and open modes, and a load circuit including in series a direct current power supply source and a load, said load circuit having a positive end connected to said one end of the first string, said load circuit having a negative end connected to said other end of the second string.

7. The combination as in claim 6 and further including means for producing a plurality of events, and means for operating each operator means in one of its states of operation in response to a different one of said plurality of events.

8. A switching system comprising respective positive and negative DC supply lines, a load, a plurality of switches connected in consecutive order to form a first series string, a second like plurality of switches connected in said consecutive order to form a second series string, one end of the first string being connected to one of the DC supply lines, a first asymmetric device connected between said one end of the first string and one end of the second string, a second asymmetric device connected between the other ends of said strings, the other end of the second string being connected through said load to the other DC supply line, a plurality of asymmetric devices other than said first and second asymmetric devices, the junction between each adjacent pair of switches in one string being connected through a different one of said plurality of asymmetric devices to the junction between the correspondingly placed pair of adjacent switches in the other string, each switch in one string and the correspondingly placed switch in the other string being referred to as a corresponding pair of switches, operator means for each corresponding pair of switches, each operator means having a first state of operation wherein one switch and the other switch of the corresponding pair associated therewith are respectively open and closed, each operator means having a second state of operation wherein said one switch and the other switch of the corresponding pair associated therewith are respectively closed and open, whereby at any given time the switches within each corresponding pair are in opposite ones of closed and open modes, all said asymmetric devices being poled in the same direction between said strings, all said asymmetric devices being so poled that if any number less than all of consecutive switches in one string beginning at one end of the string are closed while the remaining switch or switches in that string are open, one of said asymmetric devices will be forward biased providing a current path from the direct current supply lines through the load.

9. In a switching system:
   a ladder network comprising
      first and second parallel series strings and a number of asymmetric cross-links connected across said strings, each asymmetric link having respective current inlet and current outlet electrodes, each string having a number of circuit points, each of said circuit points of one string being connected through a different one of said links to the correspondingly numbered circuit point in the other string, the current inlet electrode of each asymmetric link being oriented toward the first string, and the current outlet electrode of each asymmetric link being oriented toward the second string, whereby one end of the first string is connected through one of said links to one end of the second string, and the other end of the first string is connected to the other end of the second string through another of said links;
   a number of switches, one between each pair of adjacent circuit points in each string;
   a number of switch sets, each including in interlocked relation a different one of said switches in one string and the correspondingly numbered switch in the other string, each switch set having first and second modes of operation, in one mode the two switches therein being in opposite ones of closed and open states and in the other mode the reverse thereof; and
   a load circuit including in series a direct current supply source and a load, said load circuit having positive and negative opposite ends, the positive end of the load circuit being connected to said one end of the first string, the negative end of the load circuit being connected to said other end of the second string;
   all of said links being poled in the same direction between said strings, said links being so poled that starting from a condition where all the switches of any one string are closed, said load will be substantially continuously energized through said links in consecutive order from one end of the ladder network as the switch means are operated in consecutive order from said one end of the ladder network.

10. The combination as in claim 9 and further including means for producing a plurality of events, and means for operating each switch in one of its modes in response to a different one of said plurality of events.

11. In a switching system:
   a ladder network comprising
      first and second parallel series strings and a number of asymmetric cross-links connected across said strings, each string having a number of circuit points, each of said circuit points of one string being connected through a different one of said links to the correspondingly numbered circuit point in the other string;
   a number of switches, one between each pair of adjacent circuit points in each string;
   a number of switch sets, each including in interlocked relation a different one of said switches in one string and the correspondingly numbered switch in the other string, each switch set having first and second modes of operation, in one mode the two switches therein being in opposite ones of closed and open states and in the other mode the reverse thereof;
   a pair of direct current supply lines, one end of one of said strings being connected to one of said direct current lines;
   a load connected between the other direct current line and the other end of said other string;
   all of said links being poled in the same direction between said strings, said links being so poled that if any number less than all of consecutive switches in one string beginning at one end of the string are closed while the remaining switch or switches in that string are open one of said asymmetric links will be forward biased providing a current path from the direct current supply lines through the load.

References Cited
UNITED STATES PATENTS 2,734,598    2/1956    Hornung _____ 187—29

ORIS L. RADER, *Primary Examiner.*

T. B. JOIKE, *Assistant Examiner.*